United States Patent
Lin et al.

(10) Patent No.: US 7,923,265 B2
(45) Date of Patent: Apr. 12, 2011

(54) METHOD AND SYSTEM FOR IMPROVING CRITICAL DIMENSION PROXIMITY CONTROL OF PATTERNS ON A MASK OR WAFER

(75) Inventors: Cheng-Ming Lin, Yunlin County (TW); Jen-His Chiu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 704 days.

(21) Appl. No.: 11/688,141

(22) Filed: Mar. 19, 2007

(65) Prior Publication Data

US 2008/0124826 A1 May 29, 2008

Related U.S. Application Data

(60) Provisional application No. 60/867,479, filed on Nov. 28, 2006.

(51) Int. Cl.
*H01L 21/00* (2006.01)

(52) U.S. Cl. ............... 438/14; 438/33; 257/E21.507; 257/E21.304

(58) Field of Classification Search ............ 716/21, 716/19; 438/14; 257/E21.307, E21.507
See application file for complete search history.

(56) References Cited

U.S. PATENT DOCUMENTS

| | | | |
|---|---|---|---|
| 5,288,997 A * | 2/1994 | Betzig et al. | 250/227.26 |
| 6,051,347 A | 4/2000 | Tzu et al. | |
| 6,432,588 B1 | 8/2002 | Tzu et al. | |
| 6,720,565 B2 * | 4/2004 | Innes et al. | 250/492.22 |
| 2003/0036270 A1 * | 2/2003 | Yu et al. | 438/689 |
| 2003/0207029 A1 | 11/2003 | Rawat | |
| 2004/0132223 A1 * | 7/2004 | Park et al. | 438/14 |
| 2006/0091330 A1 * | 5/2006 | Van Bilsen et al. | 250/548 |

* cited by examiner

*Primary Examiner* — Walter L Lindsay, Jr.
(74) *Attorney, Agent, or Firm* — Haynes and Boone, LLP

(57) ABSTRACT

A method for improving critical dimension uniformity of a substrate is provided. An equation based on a proximity trend of a pattern on a first substrate is determined. The equation is applied in a regression model to determine a parameter value of a second substrate. A recipe of an exposure equipment is adjusted based on the parameter value for exposure of the second substrate. Also, a system for controlling critical dimension of a pattern on a substrate is provided. The system includes an advance process control system for collecting exposure data of the substrate, and a regression model within the advance process control system for analyzing the exposure data and determining a parameter value of a recipe of the exposure tool. The regression model is operable to determine an equation based on a proximity trend of the substrate.

21 Claims, 11 Drawing Sheets

|     106     |     108     |     110     |
| :---------: | :---------: | :---------: |
| Pitch (1X)  | Target (4X) | Diff (A-golden) |
| 180         | 316         | -0.02       |
| 190         | 304         | -0.03       |
| 200         | 336         | 0.00        |
| 220         | 320         | -0.04       |
| 240         | 320         | -0.05       |
| 260         | 320         | -0.13       |
| 300         | 320         | -0.15       |
| 330         | 320         | -0.12       |
| 340         | 320         | -0.11       |
| 350         | 320         | -0.09       |
| 380         | 320         | 0.07        |
| 400         | 320         | 0.01        |
| 440         | 320         | 0.04        |
| 480         | 320         | -0.10       |
| 500         | 320         | -0.07       |
| 510         | 320         | 0.02        |
| 520         | 336         | 0.01        |
| 560         | 320         | -0.06       |
| 600         | 320         | 0.11        |
| 650         | 320         | 0.08        |
| 700         | 320         | 0.14        |
| 800         | 320         | 0.11        |
| 1000        | 320         | 0.19        |
| 1500        | 313         | 0.19        |
| Range       |             | 0.34        |

Fig. 2

METHOD AND SYSTEM FOR IMPROVING CRITICAL DIMENSION PROXIMITY CONTROL OF PATTERNS ON A MASK OR WAFER

CROSS-REFERENCE

This application claims priority to U.S. Provisional Patent Application Ser. No. 60/867,479, filed on Nov. 28, 2006.

BACKGROUND

In semiconductor manufacturing technology, the critical dimension (CD) of a mask or wafer are becoming continually smaller, for example, from 45 nm to 32 nm. It is important that the uniformity of the CD for various patterns, referred to as CD uniformity, remains at acceptable levels. Certain types of patterns require different levels of CD uniformity. For example, isolated lines as used in a microprocessor circuit may require a CD uniformity of 1.3 nm, 3 sigma for a 45 nm process, and dense lines as used in memory arrays may require a CD uniformity of 3.4 nm, 3 sigma.

The proximity of isolated/dense (iso-dense) patterns also becomes more difficult to control. While CD uniformity of the iso-dense patterns may be compensated based on the exposure dosage, a need exists for a method and system that better predicts the proximity of iso-dense patterns on a mask or wafer to improve CD uniformity of the mask or wafer.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 is a table of example pitch sizes for the exemplary pattern of FIG. 1.

DETAILED DESCRIPTION

Figure 1:
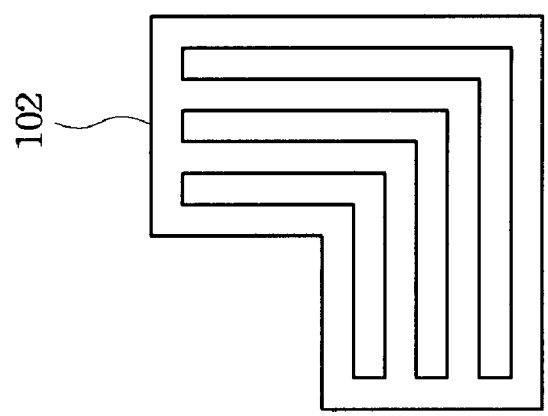
FIG. 1 is a diagram illustrating an exemplary pattern on a mask or wafer and corresponding proximity data.
Figure 1:
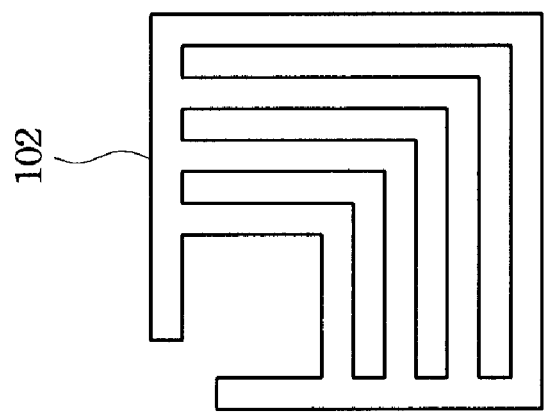
Figure 1:
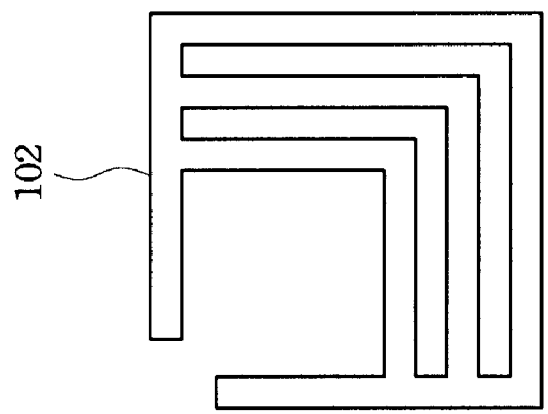

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, a diagram illustrating an exemplary pattern 100 on a mask or wafer and corresponding proximity data is depicted. Pattern 100 is referred to as a "finger" pattern, and in the present embodiment, is on a 65 nm mask. Pattern 100 comprises a plurality of iso-dense patterns 102, which have different CD sizes. Table 104 of FIG. 2 illustrates the pitch size 106 of iso-dense patterns 102 on a wafer. Table 104 also includes the CD offsets 110 corresponding to the pitch size 106. As shown in Table 104, the CD proximity range of the iso-dense patterns 102 is about 0.34 nm.

Figure 3:
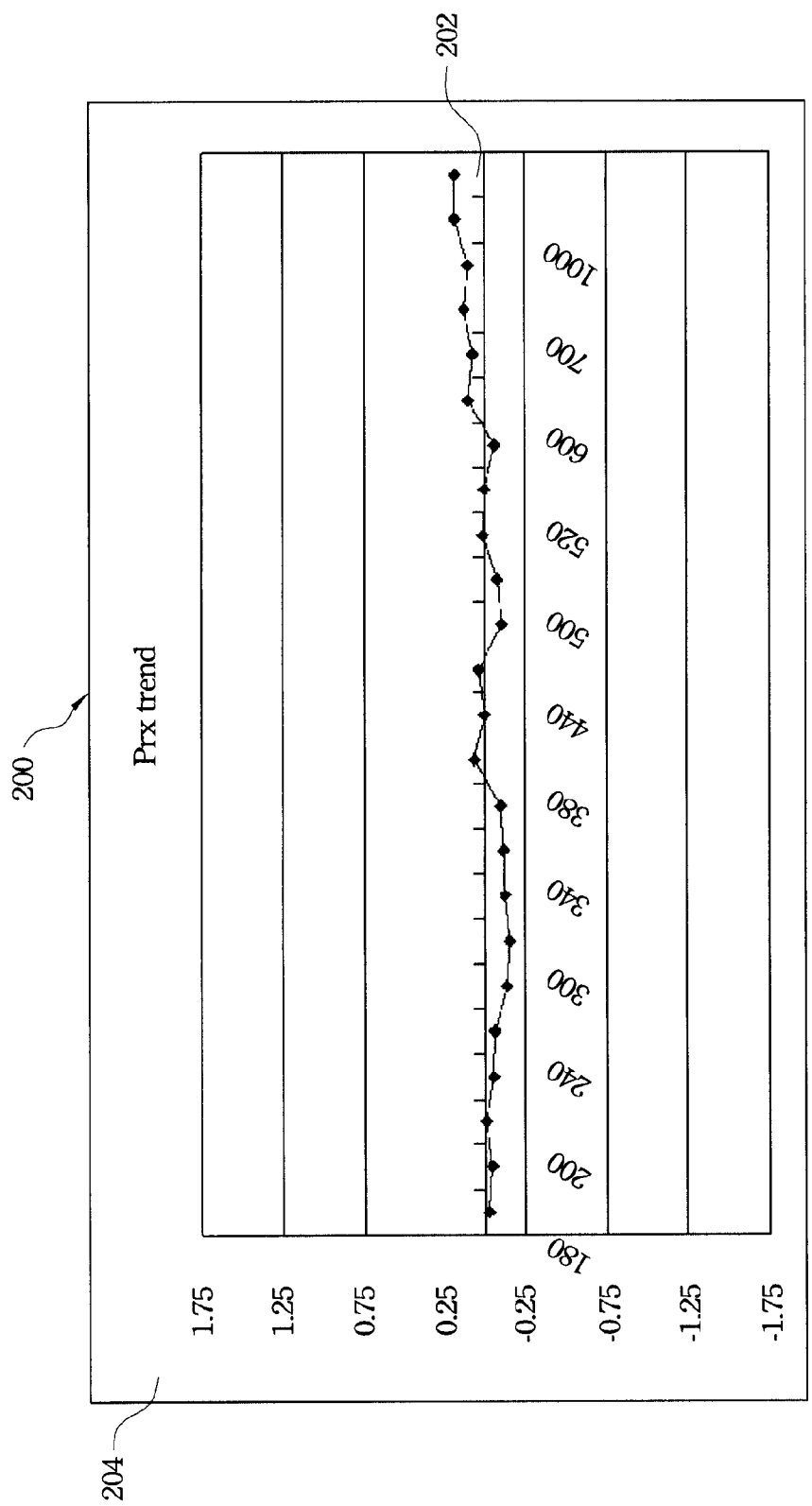
FIG. 3 is a graph illustrating a CD proximity trend of iso-dense patterns in FIG. 1.

Referring to FIG. 3, a graph 200 illustrates a CD proximity trend of the iso-dense patterns in FIG. 1. Graph 200 illustrates the pitch size 202 of iso-dense patterns 102 on a wafer (X-axis) and corresponding CD offsets 202 (Y-axis). Patterns having smaller pitch size are dense line patterns, while patterns having larger pitch size are isolated line patterns. It is observed from graph 200 that the CD proximity of iso-dense patterns 102 are relatively close to zero. Thus, in this example, the proximity of iso-dense patterns 102 on a wafer is properly controlled by exposure dosage.

Figure 4A:
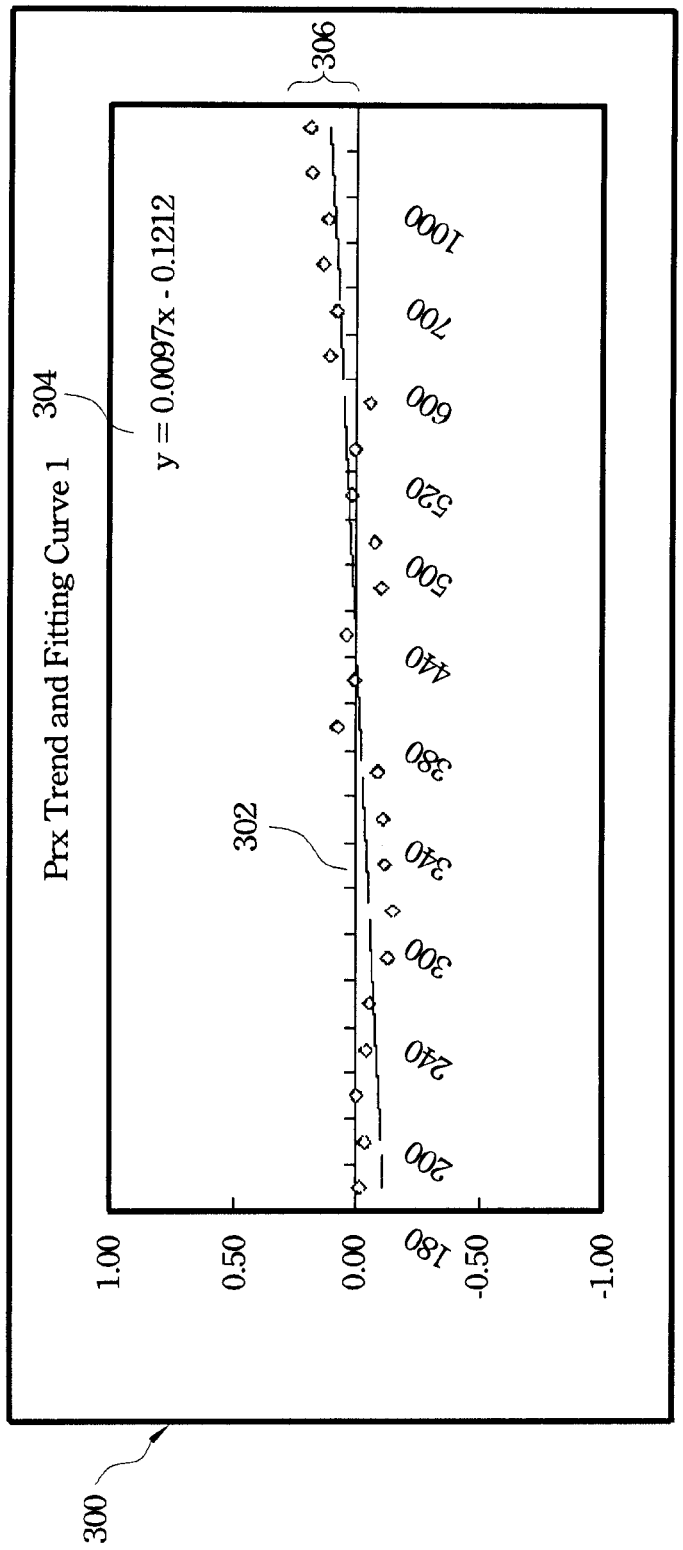
FIGS. 4a and 4b are graphs illustrating comparisons between proximity trends of iso-dense patterns on a mask based on exposure dosage control.
Figure 4B:
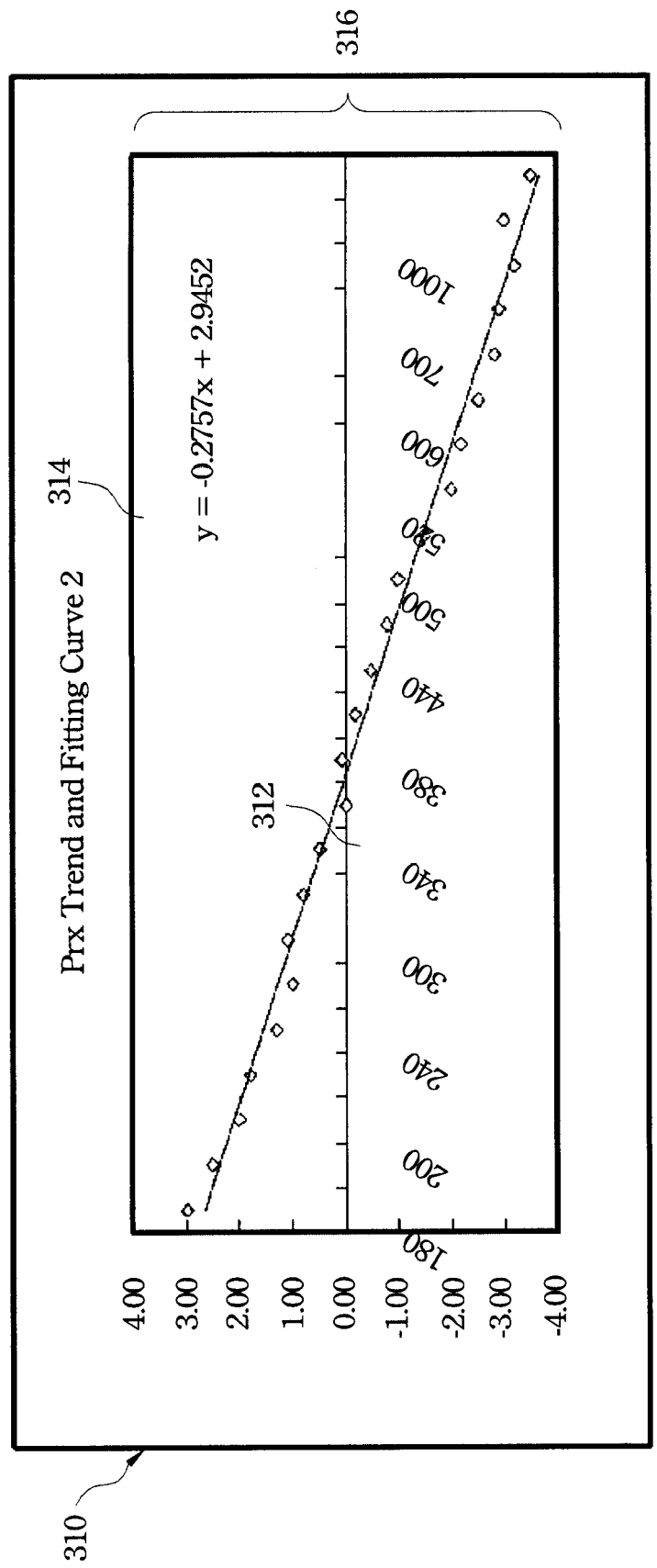

Referring to FIGS. 4a and 4b, graphs illustrating comparisons between proximity trends of iso-dense patterns on a mask based on exposure dosage control are depicted. Graph 300 illustrates the proximity trend 302 of iso-dense patterns on a mask with exposure dosage control. In exposure dosage control, a higher exposure dose may be applied to the isolated line patterns to compensate for CD offsets. In this example, the slope 304 of the proximity trend 302 is about 0.0097 and the proximity range 306 is about 0.34 nm. This is compared to graph 310, which illustrates the proximity trend 312 of iso-dense patterns on a mask without exposure dosage control. In this example, the slope 314 of the proximity trend 312 is about −0.2757 and the proximity range 316 is about 6.1 nm. It is observed that the proximity range is much higher without exposure dosage control, which affects the overall CD uniformity of the mask or wafer.

Aspects of the present disclosure provide a method and system for improving the CD proximity of a mask or wafer by providing a regressive proximity trend model in an Advance Process Control (APC) system. An Advance Processing Control (APC) system uses prediction data to adjust one or more inputs to control production equipment as defined by a recipe (e.g., a combination of such processing factors as duration, temperature, pressure, and fluid types and mixtures). In this way, the quality of processing the next iteration of a monitoring mask or wafer can be improved.

Figure 5:
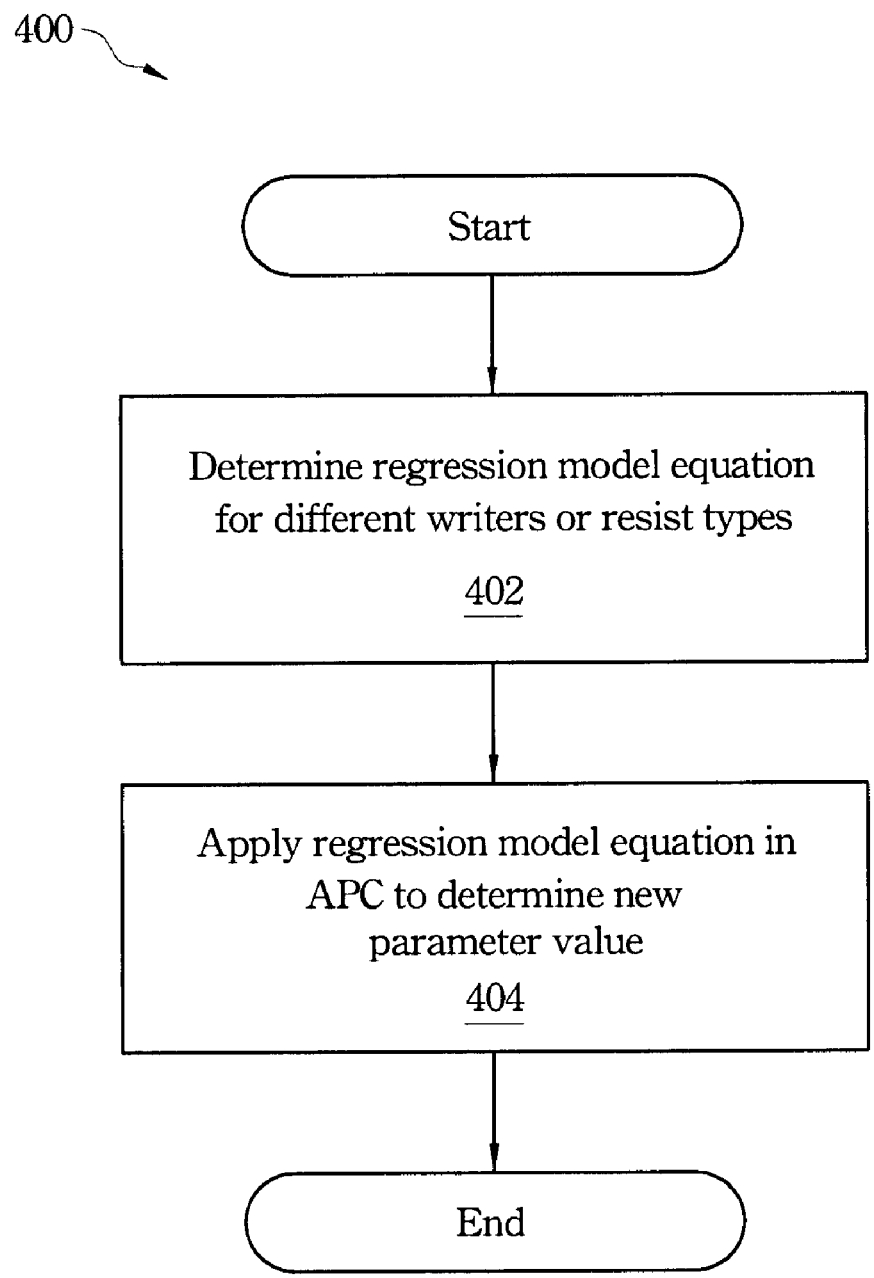
FIG. 5 is a flowchart of an exemplary process for improving the CD proximity of a mask or wafer.

Referring to FIG. 5, a flowchart of an exemplary process 400 for improving the CD proximity of a mask or wafer is depicted. Process 400 begins at step 402 to determine a regression model equation for different writers and/or resist types. More details regarding step 402 are discussed with reference to FIG. 6 below. Process 400 then continues to step 404 to apply the regression model equation determined in step 402 to determine a new parameter value. The parameter value may be any parameter used for proximity correction in a writer, for example, eta. More details regarding step 404 are discussed with reference to FIG. 8 below.

Eta is a parameter in a recipe of the exposure equipment that is being monitored by the Advance Process Control (APC) system. Eta is also discussed in U.S. Pat. No. 6,432, 588, which is hereby incorporated by reference, and is further defined by the discussion below. Eta may be used to control the iso-dense line ratio in a pattern. Equation (1 describes eta in terms of the strength of the exposed pattern density for an e-beam writer.

$$D100=D50*(1+eta)/(1+2*eta) \quad (1$$

D100 represents exposed pattern density at 100 percent and D50 represents exposed pattern density at 50 percent. The eta value may be adjusted in the equation to achieve different exposed pattern density. Eta is used in the present disclosure as an illustrative example of a proximity correction parameter of a writer. Other proximity parameters may also be determined by the regression model without departing the spirit and scope of the present disclosure.

Figure 6:
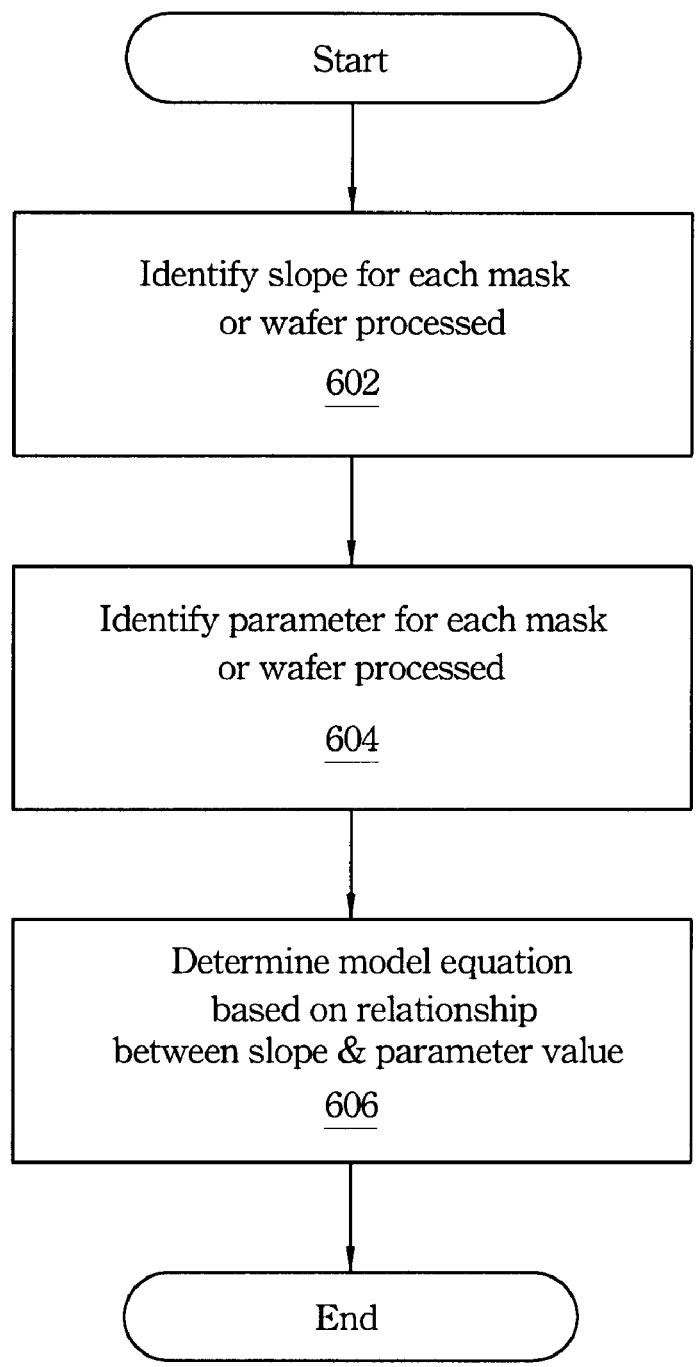
FIG. 6 is a flowchart of an exemplary process for determining a regression model equation for different writers or resist types.

Referring to FIG. 6, a flowchart of an exemplary process for determining a regression model equation for different writers or resist types is depicted. Process 402 begins at step 602 to identify a slope for each mask or wafer that is processed by the exposure equipment. Examples of the slope include slope 304 for proximity trend 302 of iso-dense patterns on a mask with exposure dosage control and slope 314 for proximity trend 304 of iso-dense patterns on a mask without exposure dosage control.

Process 402 then continues at step 604 to identify a parameter for each mask or wafer that is processed by the exposure equipment. The parameter for each mask or wafer is monitored by the APC system as the mask or wafer is being processed. An example of a parameter being monitored is eta. Process 402 then continues to step 606 to determine a regression model equation based on the relationship between the slope from step 602 and the parameter value from step 604. More details regarding how step 606 is performed are discussed with reference to FIG. 7 below.

Figure 7:
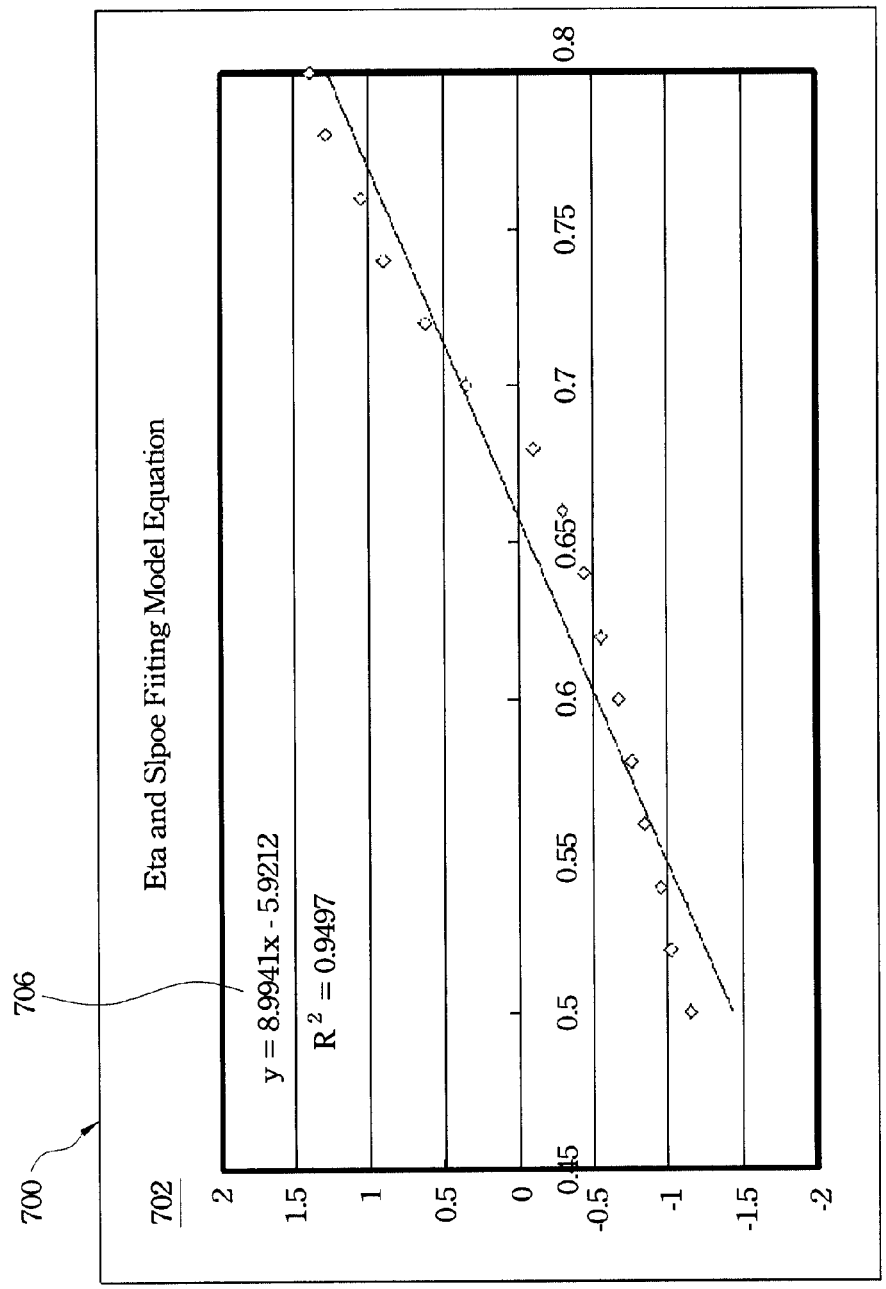
FIG. 7 is a graph illustrating a relationship between the slope and a parameter value of each mask or wafer.

Referring to FIG. 7, a graph illustrating a relationship between the slope and a parameter value of each mask or wafer is depicted. Graph 700 illustrates the slope 702 of the proximity trend of each mask or wafer being processed and the corresponding parameter value 704 monitored. The parameter value used in this example is eta. The value 8.99 of equation 706 represents the slope of the proximity trend of each mask or wafer processed. A regression model equation (2 shown below is derived based on relationship of the slope and the parameter value.

$$Y=8.99*X+C \quad (2$$

In this example, Y represents the slope, and X represents the parameter value. C is a constant depending on the process conditions. Y is based on the type of resist used or the type of writer. Thus, different Y value may be derived for different types of resist or writer.

Figure 8:
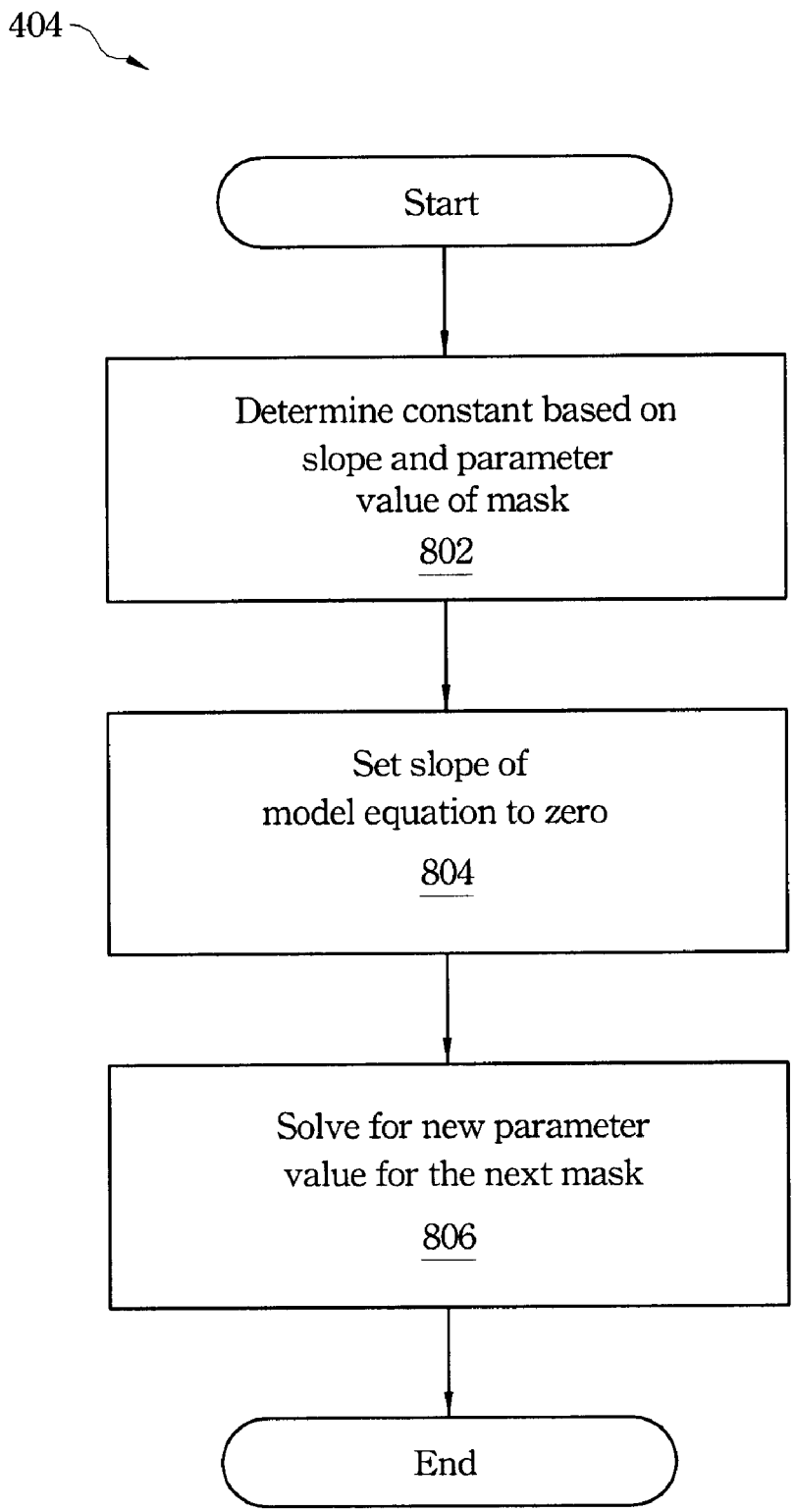
FIG. 8 is a flowchart of an exemplary process for applying the regression proximity equation in the Advanced Process Control (APC) system.

After the regression model equation (2 is determined, the equation is applied in the APC system to determine new parameter value for a new mask in the next iteration. Referring to FIG. 8, a flowchart of an exemplary process for applying the regression proximity equation in the Advanced Process Control (APC) system is depicted. Process 404 begins at step 802 to determine the constant C based on the slope and parameter value of a mask. For example, if the slope of a mask is −0.51 and the parameter value is 0.7, the constant C may be determined by substituting the slope as Y and parameter value as X into the regression model equation Y=8.99*X+C. Based on this equation, C is equal to −6.8. With the value of constant C, the regression model equation may be expressed as Y=8.99*X−6.8.

Process 404 then continues to step 804 to set the slope Y equal to zero in order to achieve a near zero CD offset. Thus, regression model equation (2 becomes Y=0=8.99*X−6.8. Process 404 then continues to step 806 to solve for the new parameter value X for the new mask in the next iteration. Continuing with the above example, the new parameter value X is 0.75. Using the new parameter value, the exposure job file of the exposure equipment may be adjusted by the APC system for exposure of the new mask in the next iteration.

Figure 9:
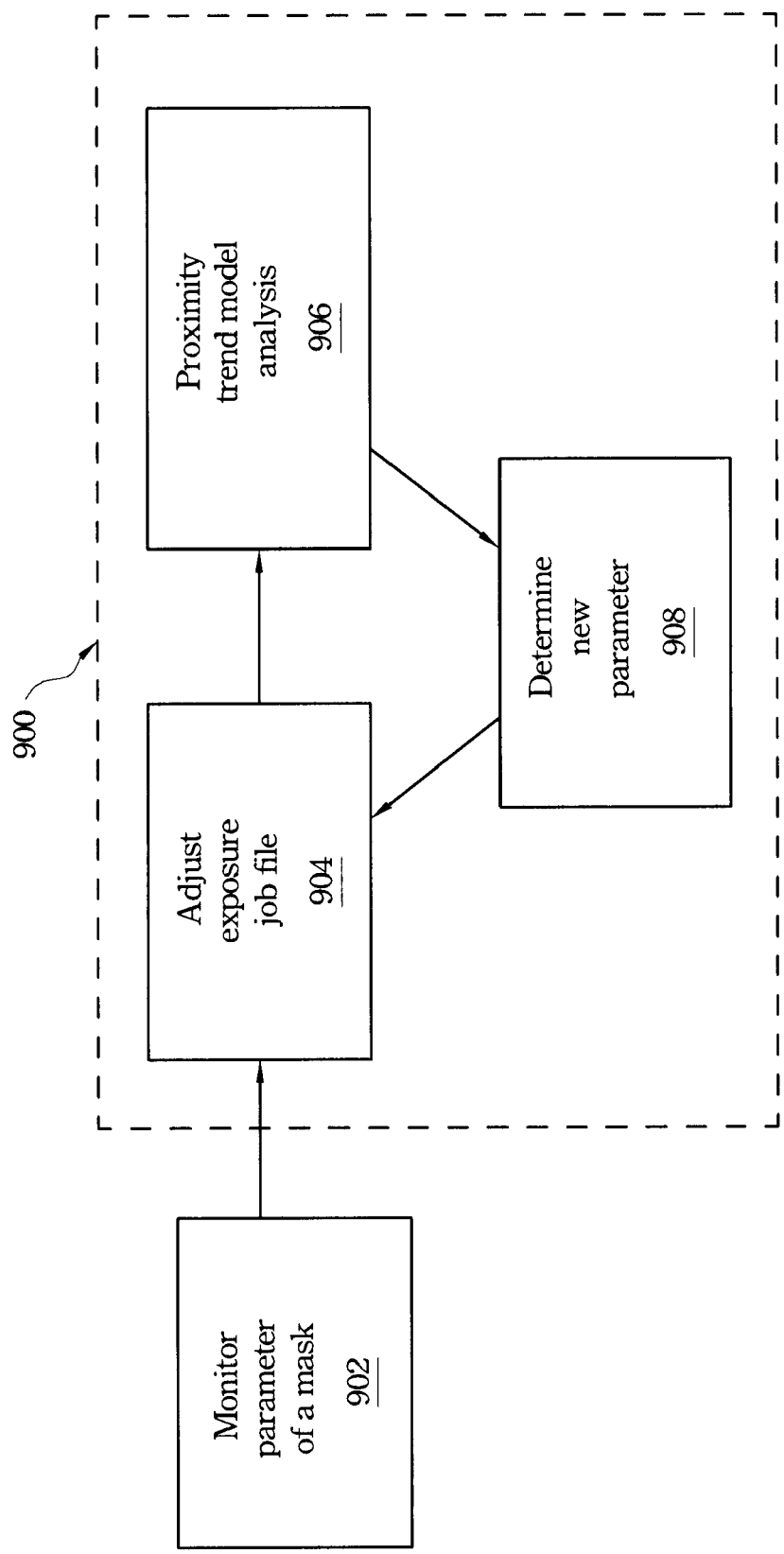
FIG. 9 is a flowchart of an exemplary process of the APC system.

In one embodiment, process 404 may be implemented within an APC system that is independent of the exposure equipment or writer. Referring to FIG. 9, a flowchart of an exemplary process of the APC system is depicted. At step 902, APC system 900 monitors the parameter value 902 of each mask being processed. At step 904, the APC system 900 adjusts the exposure job file of the exposure equipment or writer. The exposure job file includes all of the parameters for adjusting a recipe of the exposure equipment including parameter value such as eta. After the exposure job file is adjusted, exposure is performed in an exposure equipment or writer.

At step 906, the APC system 900 performs a proximity trend model analysis. Step 906 may be performed either manually or automatically by the APC system 900. At step 908, the APC system determines the new parameter value and returns to step 904 to adjust the parameter value in the exposure job file for exposure of a new mask in the next iteration. By performing a regressive proximity trend analysis to determine new parameter value and using the new parameter value to re-adjust the exposure job file, the CD proximity range of the iso-dense patterns may be minimized to near zero. Thus, CD uniformity of the mask may be improved.

Figure 10:
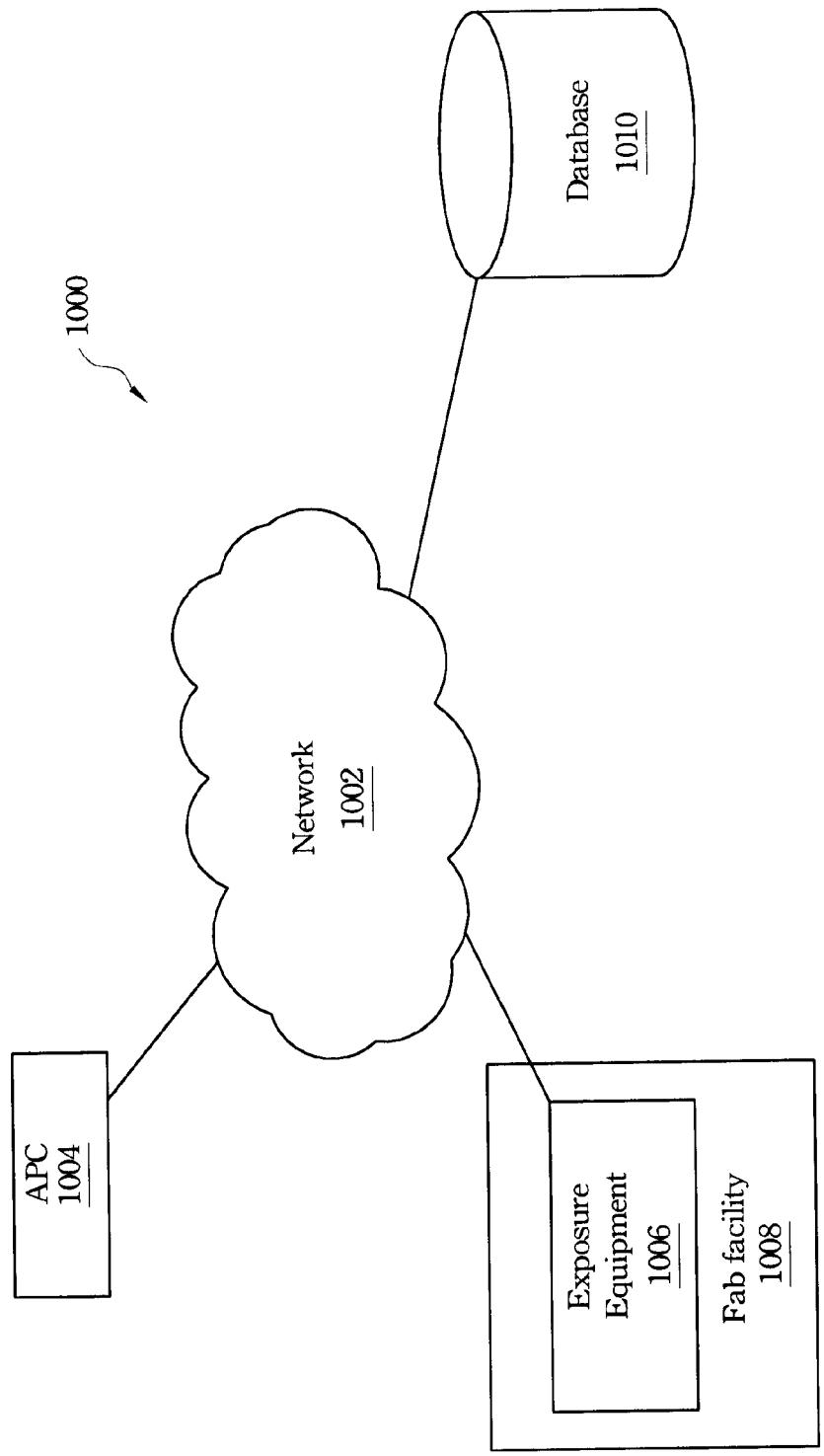
FIG. 10 is a diagram of a system for improving critical dimension proximity of a pattern on a mask or wafer.

An example of a model for deriving the regression model equation is illustrated in FIG. 10. The function (3 below expresses the relationship between the proximity slope and writer exposure parameter values for all of the masks or wafers processed.

$$y=an*X^n+an-1*X^{(n-1)}+\ldots+a1*X+a0 \quad (3$$

In this example, y represents the proximity slope corresponding to all of the parameter values monitored. $X^n$, $X^{(n-1)}$, ..., X represent all of the eta values monitored. an, a(n−1), ..., a1, and a0 are constants. The function (3 is a regression model equation for all of the masks or wafers processed by the writer.

An example of a model for applying the regression model equation to determine new eta value is shown in function (4, below.

$$y=0=an*X^n+an-1*X^{(n-1)}+\ldots+a1*X+a0 \quad (4$$

First, y and X of a mask is substituted into function (3 to determine constants an, a(n−1), ..., a1, and a0. Next, y is set to equal to zero to form function (4. Using function (4, the new eta values $X^n$, $X^{(n-1)}$, ..., X for the new masks in future iterations may be determined. Using the new eta values, the exposure job file of the exposure equipment may be adjusted by the APC system for exposure of the new masks in future iterations.

It is noted that in addition to improving critical dimension proximity control for masks, aspects of the present disclosure may be implemented as a method and system for improving CD proximity when writing a pattern directly to a wafer. For example, the regression proximity trend model may be implemented in an electron beam (e-beam) writing system that transfers a high-resolution pattern to a wafer. In this way, the critical dimension uniformity of a wafer may also be improved.

Referring to FIG. 10, a diagram of a system for improving critical dimension proximity of a pattern on a mask or wafer is depicted. System 1200 comprises a plurality of entities that are connected by a communications network 1202. The network 1202 may be a single network or may be a variety of different networks, such as an intranet and the Internet, and may include both wired and wireless communication channels. Each entity may interact with other entities and may provide services to and/or receive services from the other entities.

In the present example, the entities include an APC system 1204, an exposure equipment 1206 within a fab facility 1208, and a database 1210. Upon exposure, data may be collected from the exposure equipment 1206 by the APC system 1204 and stored in the database 1210. Aspects of the present disclosure may be implemented within the APC system 1204 to analyze data either from the exposure equipment 1206 or the database 1210. Based on the data, a regression model equation may be determined based on the types of writer or resist used and the regression model equation may be applied in the APC system 1204 to determine a new eta value for a new mask in the next iteration. It is noted that aspects of the present disclosure may be implemented as a software application executing within the APC system 1204 or any other data processing system.

Based on the new eta value, the regression model may continuously improve. By providing an improved regression model, the proximity range of iso-dense patterns on a mask or wafer becomes smaller and smaller until it is near zero. For example, the proximity range of iso-dense patterns may be improved by as much as 70 percent when applied in the APC system 1204.

In one embodiment, a method for improving critical dimension uniformity of a substrate is provided. An equation based on a proximity trend of a pattern on a first substrate is determined. The equation is applied in a regression model to determine a parameter value of a second substrate. A recipe of an exposure equipment is adjusted based on the parameter value for exposure of the second substrate.

In another embodiment, a method for controlling critical dimension of a pattern on a substrate is provided. A model is provided to analyze exposure data of a substrate. An equation is determined for the model based on the exposure data. A recipe of an exposure tool is automatically adjusted using the equation.

In yet another embodiment, a system for controlling critical dimension of a pattern on a substrate is provided. The system comprises an advance process control system for collecting exposure data of the substrate, and a regression model within the advance process control system for analyzing the exposure data and determining a parameter value of a recipe of the exposure tool. The regression model is operable to determine an equation based on a proximity trend of the substrate.

Although only a few exemplary embodiments of this invention have been described in detail above, those skilled in the art will readily appreciate that many modifications are possible in the exemplary embodiments without materially departing from the novel teachings and advantages of this invention. It is understood that various different combinations of the above-listed steps can be used in various sequences or in parallel, and there is no particular step that is critical or required. Also, features illustrated and discussed above with respect to some embodiments can be combined with features illustrated and discussed above with respect to other embodiments. Accordingly, all such modifications are intended to be included within the scope of this invention.

What is claimed is:

1. A method for improving critical dimension uniformity, the method comprising:
    determining an equation based on a proximity trend of a pattern on a first substrate including:
    identifying a slope of the first substrate from a plot;
    identifying a parameter value of the first substrate; and
    determining the equation based on a relationship between the slope and the parameter value of the first substrate;
    applying the equation in a regression model to determine a parameter value of a second substrate; and
    adjusting a recipe of an exposure equipment based on the parameter value for exposure of the second substrate.

2. The method of claim 1, wherein applying the equation in a regression model to determine a parameter value of a second substrate comprises:
    determining a constant of the equation based on the slope and the parameter value of the first substrate;
    setting a slope of the equation to zero; and
    solving the equation for the parameter value of the second substrate.

3. The method of claim 1, wherein adjusting the recipe of the exposure equipment based on the parameter value for exposure of a second substrate comprises:
    adjusting an exposure job file of the exposure equipment used based on the parameter value.

4. The method of claim 1, wherein adjusting the recipe of the exposure equipment based on the parameter value for exposure of a second substrate comprises:
    adjusting an exposure dosage used for exposure of the second substrate.

5. The method of claim 1, wherein the determining, applying, and adjusting steps are performed within the regression model in an Advance Process Control (APC) System.

6. The method of claim 1, wherein identifying the slope of the first substrate comprises:
    identifying a plurality of critical dimension offsets of the first substrate;
    identifying a plurality of pitch sizes of the first substrate; and
    determining the slope based on a relationship between the plurality of critical dimension offsets and the plurality of pitch sizes.

7. The method of claim 1, wherein a slope of the equation is different for different types of exposure equipment or photo resist.

8. The method of claim 1, wherein the parameter value is related to an exposed density of the pattern on the first substrate.

9. The method of claim 2, wherein determining a constant of the equation based on the slope and the parameter value of the first substrate comprises:
    substituting the slope and the parameter value of the first substrate into the equation.

10. The method of claim 1, wherein the equation is Y=proximity slope*X+C, wherein Y is the slope of the equation, wherein proximity slope is the slope of the first substrate, wherein X is the parameter value of the first substrate, and wherein C is a constant based on process conditions.

11. The method of claim 1, wherein the equation is Y=an*X^n+an−1*X^(n−1)+ ... +a1*X+a0, wherein Y represents a proximity slope corresponding to parameter values of a plurality of substrates, wherein $X^n$, $X^{(n-1)}$, ..., X represent parameter values a plurality of substrates, and wherein an, $a(n-1)$, ..., a1, and a0 are constants.

12. The method of claim 1, wherein the substrate is a mask or a wafer.

13. The method of claim 1, wherein the exposure equipment is an image writer or an electron beam writer.

14. A method for controlling critical dimension of a pattern on a substrate, the method comprising:
   providing exposure data for a substrate including a plurality of critical dimension offsets, corresponding plurality of pitch sizes, and an exposure parameter;
   determining an equation for a model based on the exposure data, wherein determining the equation includes:
      generating a plot of the plurality of critical dimension offsets versus the plurality of pitch sizes;
      determining the slope of the plot; and
   automatically adjusting a recipe of an exposure tool using the equation.

15. The method of claim 14, wherein exposure data includes a proximity trend of the substrate, wherein the proximity trend is based on a critical dimension offset of a pattern on the substrate and a pitch size of the substrate.

16. The method of claim 15, wherein determining an equation for the model based on the exposure data comprises
   wherein the parameter value is being monitored by an advance process control system, and wherein the parameter is eta.

17. The method of claim 15, wherein automatically adjusting a recipe of an exposure tool using the equation comprises:
   identifying a new parameter value based on the equation; and
   adjusting the recipe of the exposure tool for exposure of a new substrate based on the new parameter value.

18. A system for controlling critical dimension of a pattern on a substrate, the method comprising:
   an advance process control system for collecting exposure data of the substrate, wherein the exposure data includes an offset of a critical dimension for a pitch size of a pattern on the substrate; and
   a regression model within the advance process control system for analyzing the exposure data and determining a parameter value of a recipe of the exposure tool.

19. The system of claim 18, wherein the regression model is operable to determine an equation based on a proximity trend of the substrate.

20. The system of claim 19, wherein the equation is $Y = an*X^n + an-1*X^{(n-1)} + ... + a1*X + a0$, wherein Y represents a proximity slope corresponding to parameter values of a plurality of substrates, wherein $X^n$, $X^{(n-1)}$, ..., X represent parameter values a plurality of substrates, and wherein an, $a(n-1)$, ..., a1, and a0 are constants.

21. The method of claim 1, wherein the parameter value is an eta value of the exposure equipment.

* * * * *